US012699598B2

(12) United States Patent
An et al.

(10) Patent No.: US 12,699,598 B2
(45) Date of Patent: Aug. 4, 2026

(54) METHOD FOR RAPID SERVICE DEPLOYMENT IN HYBRID CLOUD ENVIRONMENT

(71) Applicant: Korea Electronics Technology Institute, Seongnam-si (KR)

(72) Inventors: Jae Hoon An, Incheon (KR); Young Hwan Kim, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 672 days.

(21) Appl. No.: 17/983,630

(22) Filed: Nov. 9, 2022

(65) Prior Publication Data

US 2023/0153170 A1     May 18, 2023

(30) Foreign Application Priority Data

Nov. 12, 2021     (KR) ........................ 10-2021-0155946

(51) Int. Cl.
| | | |
|---|---|---|
| *G06F 9/50* | (2006.01) | |
| *G06F 9/455* | (2018.01) | |
| *G06F 9/48* | (2006.01) | |

(52) U.S. Cl.
CPC .......... *G06F 9/5077* (2013.01); *G06F 9/4856* (2013.01); *G06F 9/4875* (2013.01); *G06F 9/505* (2013.01); *G06F 9/5072* (2013.01); *G06F 9/5088* (2013.01); *G06F 9/45558* (2013.01); *G06F 2009/45562* (2013.01); *G06F 2009/4557* (2013.01); *G06F 2209/501* (2013.01); *G06F 2209/5019* (2013.01); *G06F*
*2209/5022* (2013.01); *G06F 2209/503* (2013.01); *G06F 2209/505* (2013.01)

(58) Field of Classification Search
None
See application file for complete search history.

(56) References Cited

U.S. PATENT DOCUMENTS

| | | | | |
|---|---|---|---|---|
| 10,719,342 B2 * | 7/2020 | Folco | ................... | G06F 3/0644 |
| 11,336,519 B1 * | 5/2022 | Greenwood | ........ | H04L 41/0816 |
| 12,050,938 B2 * | 7/2024 | Hiregoudar | ............ | G06F 3/061 |

(Continued)

OTHER PUBLICATIONS

NIRS 2020 4*th* quarter newsletter, "Evolution of cloud platform operations management" 2020, (Abstract in English, 2 pages in Korean).

(Continued)

*Primary Examiner* — Abu Zar Ghaffari
(74) *Attorney, Agent, or Firm* — NSIP Law

(57) ABSTRACT

There are provided a method and an apparatus for hybrid cloud management, which configure, reconfigure, and manage service resources in order to rapidly deploy a service in a hybrid cloud environment. According to embodiments of the disclosure, when there is a request for resources of a service operating in an existing cloud environment (Kubernetes), problems of a method of simply expanding replicas may be solved, and rapid processing (deployment) may be performed in response to a continuous resource request. In addition, an available space for using resources may be guaranteed by applying a method of HPA (increasing the number of resource replicas), VPA (increasing allocated resources), migration (transferring resources), rather than simply expanding the number of replicas.

17 Claims, 6 Drawing Sheets

(56) References Cited

U.S. PATENT DOCUMENTS

| | | | | |
|---|---|---|---|---|
| 2013/0339419 | A1* | 12/2013 | Emaru | H04L 67/01 |
| | | | | 709/201 |
| 2015/0039764 | A1* | 2/2015 | Beloglazov | H04L 67/52 |
| | | | | 709/226 |
| 2016/0103699 | A1* | 4/2016 | Thakkar | G06F 9/45558 |
| | | | | 718/1 |
| 2016/0292053 | A1* | 10/2016 | Antony | G06F 21/577 |
| 2017/0041189 | A1* | 2/2017 | Aswathanarayana | H04L 67/34 |
| 2017/0339065 | A1* | 11/2017 | Li | H04L 47/2416 |
| 2018/0267833 | A1* | 9/2018 | Chen | G06F 9/45558 |
| 2020/0084106 | A1* | 3/2020 | Johnson | H04L 41/0893 |
| 2020/0183703 | A1* | 6/2020 | Kumar | G06F 9/45558 |
| 2020/0241754 | A1* | 7/2020 | Bett | G06F 3/067 |
| 2020/0409761 | A1* | 12/2020 | Stuntebeck | G06F 9/5027 |
| 2021/0406053 | A1* | 12/2021 | Mani | G06F 9/5077 |
| 2022/0318060 | A1* | 10/2022 | Choochotkaew | G06N 5/02 |
| 2022/0398520 | A1* | 12/2022 | Panikkar | G06Q 30/0201 |
| 2022/0400150 | A1* | 12/2022 | Bade | H04L 67/1023 |
| 2023/0029853 | A1* | 2/2023 | Xu | G06F 9/5005 |
| 2023/0104787 | A1* | 4/2023 | Hassan | G06F 9/5061 |
| | | | | 718/104 |

OTHER PUBLICATIONS

Kim, Han Gyeol, et al. "Auto-scaling system design for resource reconfiguration in Hybrid Cloud environment." Proceedings of the Korean Electrical Society Conference (2021): 322-323, (Abstract in English, 2 pages in Korean).

Korean Office Action issued on Nov. 30, 2023, in counterpart Korean Patent Application No. 10-2021-0155946 (3 pages in English, 5 pages in Korean).

* cited by examiner

S610 — COLLECT METRIC DATA REGARDING RESOURCE USE RATE

S620 — SCALE IN AT LEAST ONE METHOD OF VPA AND HPA

S630 — PERFORM MIGRATION BETWEEN CLUSTERS

METHOD FOR RAPID SERVICE DEPLOYMENT IN HYBRID CLOUD ENVIRONMENT

CROSS-REFERENCE TO RELATED APPLICATION(S) AND CLAIM OF PRIORITY

This application is based on and claims priority under 35 U.S.C. § 119 to Korean Patent Application No. 10-2021-0155946, filed on Nov. 12, 2021, in the Korean Intellectual Property Office, the disclosure of which is herein incorporated by reference in its entirety.

BACKGROUND

Field

The disclosure relates to a method and an apparatus for hybrid cloud management, and more particularly, to a method and an apparatus for hybrid cloud management, which configure, reconfigure, and manage service resources in order to rapidly deploy a service in a hybrid cloud environment.

Description of Related Art

Existing public cloud-based interlocking systems are independently defined, and thus, there is a demerit that it is difficult to establish a consistent interlocking technology.

In addition, management objects in an existing public cloud environment are managed under independent systems of cloud suppliers and consistent management and integrated insights are not provided, and each cloud provides individual cloud monitoring. Therefore, there is a demerit that it is impossible to establish an integrated insight and a management strategy for whole resources.

Heterogenous cloud resources optimization may have a demerit that it is difficult to uniformly use resources between clusters since there are many factors to be considered in comparison to a homogenous cloud environment.

In addition, guaranteeing availability in an existing single cloud may make it difficult to respond to overload or disorder of whole resources of a hybrid cloud, and heterogenous cloud resources optimization may have a demerit that it is difficult to uniformly use resources between clusters since there are many factors to be considered in comparison to a homogenous cloud environment.

In addition, a method of simply increasing the number of replicas when there is a request for resources of a service operating in an existing cloud environment (Kubernetes) may cause a delay in providing resources consistently requested in a cloud environment (a small resource available space is generated compared to requested resources), and may influence management of an existing service.

Accordingly, there is a demand for a method for supporting redeployment/reconfiguration resource management based on a resource use rate in order to guarantee available resources and consistently optimize resources with respect to a service operating in a hybrid cloud platform environment (a combination of heterogenous cloud models).

SUMMARY

To address the above-discussed deficiencies of the prior art, it is a primary object of the disclosure to provide a method and an apparatus for hybrid cloud management, which analyze a resource use rate by monitoring an application service operating in a hybrid cloud using environment, and apply defragmentation for resources according to the resource use rate.

Another object of the disclosure is to provide a method and an apparatus for hybrid cloud management, which guarantee an available space for using resources by applying a method of horizontal pod autoscaling (HPA) (increasing the number of resource replicas), vertical pod autoscaling (VPA) (increasing allocated resources), migration (transferring resources), rather than simply expanding the number of replicas.

According to an embodiment of the disclosure to achieve the above-described objects, a hybrid cloud management method includes: collecting, by a hybrid cloud management device, metric data regarding a resource use rate from one or more clusters supporting an application service operating in a hybrid cloud using environment; and analyzing, by the hybrid cloud management device, the resource use rate, based on the collected metric data, and performing resource defragmentation for guaranteeing resources according to a result of the analyzing.

In addition, performing the resource defragmentation may include, when a current resource use rate is greater than or equal to a threshold value included in a pre-set policy, performing the resource defragmentation for guaranteeing the resources.

In addition, performing the resource defragmentation may include performing the resource defragmentation for guaranteeing the resources with respect to all clouds supporting the application service operating in the hybrid cloud using environment, and the resource defragmentation may be performed by performing at least two methods of HPA (increasing a number of resource replicas), VPA (increasing allocated resources), and migration (transferring resources), simultaneously, rather than simply expanding a number of replicas.

In addition, performing the resource defragmentation may include: scaling in at least one method of the VPA and the HPA by considering a current state of available resources; and, when the resource use rate is greater than or equal to the threshold value included in the pre-set policy even when scaling is performed, performing migration.

In addition, the hybrid cloud management device may include: a policy management module configured to manage a policy set by a user; a policy check module configured to acquire information regarding the set policy from the policy management module, and to determine whether the current resource use rate is greater than or equal to the threshold value included in the pre-set policy, based on the information regarding the set policy; and a resource management module configured to perform resource defragmentation when the current resource use rate is greater than or equal to the threshold value included in the pre-set policy.

In addition, when available resources of a node including a specific pod are less than resources allocated to the specific pod, the resource management module may scale the resources of the specific pod in the VPA by increasing the resources allocated to the specific pod.

In addition, when available resources of a node including a specific pod are larger than or equal to resources allocated to the specific pod, the resource management module may scale the resources of the specific pod in the HPA by generating a replica pod in the corresponding node by copying the same pod as the specific pod, and by setting the specific pod and the replica pod to perform a same service.

In addition, the resource management module may perform migration between clusters when the resource use rate is greater than or equal to the threshold value included in the pre-set policy even after scaling is performed by at least one method of the VPA and the HPA.

In addition, the resource management module may predict a resource use rate of a future time regarding a plurality of nodes included in one or more interlocking clusters by using a prediction model, may filter a node a resource use rate of which increases by a pre-set threshold value or more, based on a result of the predicting, and may select, as a migration target cluster, a cluster that includes a node having a lowest resource use rate among remaining nodes, and perform migration.

According to another embodiment of the disclosure, a computer-readable recording medium has a computer program recorded thereon to perform a hybrid cloud management method, the method including: collecting, by a hybrid cloud management device, metric data regarding a resource use rate from one or more clusters supporting an application service operating in a hybrid cloud using environment; and analyzing, by the hybrid cloud management device, the resource use rate, based on the collected metric data, and performing resource defragmentation for guaranteeing resources according to a result of the analyzing.

According to another embodiment of the disclosure, a hybrid cloud management device includes: a communication unit configured to collect metric data regarding a resource use rate from one or more clusters supporting an application service operating in a hybrid cloud using environment; and a processor configured to analyze the resource use rate, based on the collected metric data, and to perform resource defragmentation for guaranteeing resources according to a result of the analyzing.

According to another embodiment of the disclosure, a hybrid cloud management system includes a hybrid cloud platform configured by a combination of a plurality of clouds including one or more cluster; and a hybrid cloud management device configured to collect metric data regarding a resource use rate from one or more clusters supporting an application service operating in a hybrid cloud using environment; and to analyze the resource use rate, based on the collected metric data, and to perform resource defragmentation for guaranteeing resources according to a result of the analyzing.

According to embodiments of the disclosure as described above, when there is a request for resources of a service operating in an existing cloud environment (Kubernetes), problems of a method of simply expanding replicas may be solved, and rapid processing (deployment) may be performed in response to a continuous resource request.

In addition, an available space for using resources may be guaranteed by applying a method of HPA (increasing the number of resource replicas), VPA (increasing allocated resources), migration (transferring resources), rather than simply expanding the number of replicas.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in detail with reference to the accompanying drawings.

Figure 1:
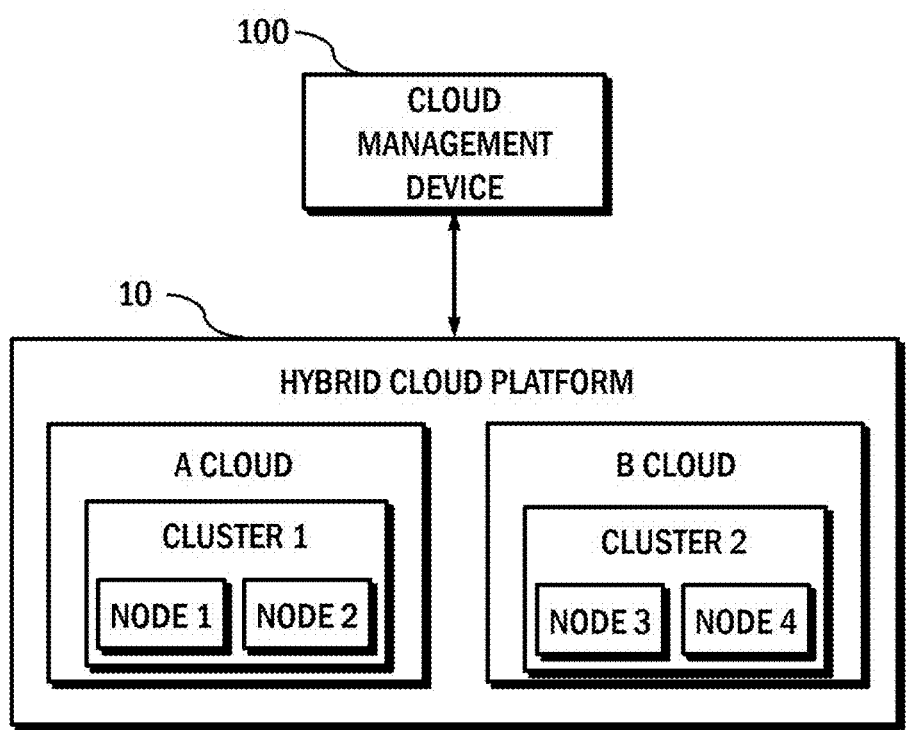
FIG. 1 is a view provided to explain a configuration of a hybrid cloud system according to an embodiment of the disclosure.

FIG. 1 is a view provided to explain a configuration of a hybrid cloud system according to an embodiment of the disclosure.

The hybrid cloud system according to an embodiment may analyze a resource use rate by monitoring an application service operating in a hybrid cloud using environment, and may perform defragmentation for resources according to the resource use rate.

Specifically, when performing defragmentation, the hybrid cloud system may guarantee an available space for using resources by applying a method of HPA (increasing the number of resource replicas), VPA (increasing allocated resources), migration (transferring resources), rather than simply expanding the number of replicas.

To achieve this, in the hybrid cloud system, a hybrid cloud platform 10 which is configured by a combination of a plurality of clouds including one or more clusters may be managed by a hybrid cloud management device 100, as shown in FIG. 1.

Specifically, the hybrid cloud management device 100 may collect metric data regarding a resource use rate from one or more clusters which support an application service operating in a hybrid cloud using environment, may analyze a resource use rate based on the collected metric data, and may perform resource defragmentation for guaranteeing resources according to a result of the analyzing.

Herein, the hybrid cloud management device 100 may be implemented by a physically independent device, or may be implemented to be included in a certain device, system or hybrid cloud as a part, and may be implemented in the form of software like a program, a platform, a framework or an application installed in a smartphone, a computer, a server, or a hybrid cloud. In addition, respective components of the hybrid cloud management device 100 may be implemented by physical components or components in the form of a function of software.

The hybrid cloud platform 10 is a platform that is configured by a combination of a plurality of cloud servers, which include one or more clusters, and provides a hybrid cloud service through virtualization, and may be implemented by Docker, Kubernetes, etc.

As shown in FIG. 1, the hybrid cloud platform 10 may include a plurality of clouds including one or more clusters, and one cluster may include a plurality of nodes, and the node may include at least one pod.

Herein, the cluster is a plurality of servers which are virtualized to look like one server, and may be positioned by regions. Specifically, the hybrid cloud platform 10 of FIG. 1 may include cluster 1 and cluster 2, and cluster 1 and cluster 2 may be positioned in different regions and zones. Herein, the region may refer to a continent and the zone may refer to a country.

In addition, one cluster may include a plurality of nodes. The node indicates a server unit based on which a real service (or container) is executed. The node may perform a role of generating a service and managing a service state, and may include a plurality of pods.

The hybrid cloud platform 10 of the above-described structure may perform a function of allocating resources for executing a specific service to a node that is determined by the hybrid cloud management device 100.

In addition, the hybrid cloud management device 100 may perform a function of a master of managing all clusters. All commands are to invoke an application programming interface (API) server of the hybrid cloud management device 100, which is a master, and the node may perform a necessary operation while communicating with the hybrid cloud management device 100.

When a command is issued for a container of a specific node or a log is retrieved, the command may be transmitted to the hybrid cloud management device 100, rather than being directly transmitted to the node, and the hybrid cloud management device 100 may access the node and may respond with a result instead.

Figure 2:
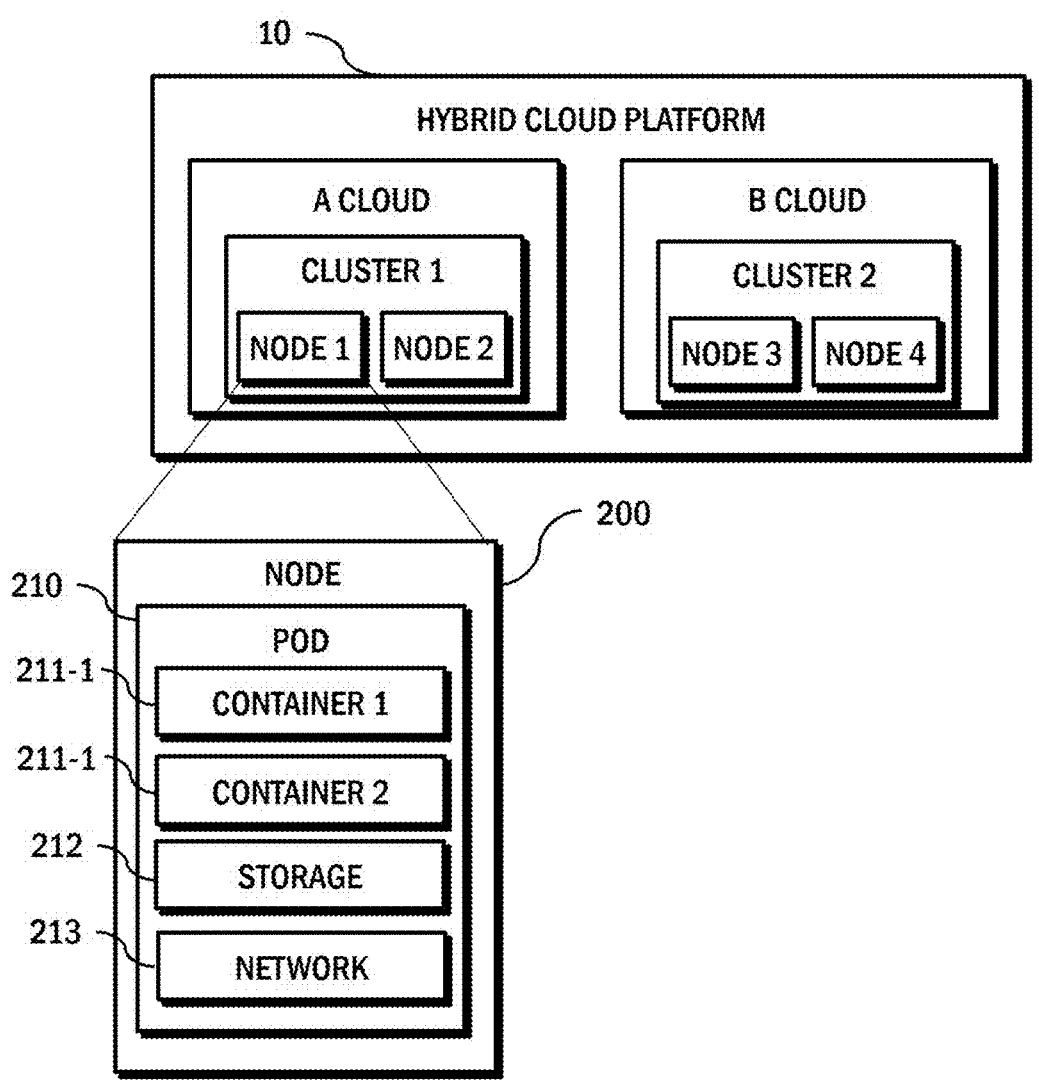
FIG. 2 is a view provided to explain a detailed configuration of a hybrid cloud platform according to an embodiment of the disclosure.

The node may include at least one pod. A structure of the node described above will be described in detail with reference to FIG. 2. FIG. 2 is a view illustrating a detailed configuration of the hybrid cloud platform 10 according to an embodiment.

As shown in FIG. 2, the hybrid cloud platform 10 may include a plurality of nodes 200, and the node may include at least one pod 210.

The node 200 may generate a necessary pod 210 and may set a network 215 and a storage 213 while communicating with the hybrid cloud management device 100.

The pod 210 is the smallest deployment unit and is where real containers are generated. The pod 210 may be generated and managed by a controller or a ReplicaSet, and may be expanded to hundreds of pods or thousands of pods. The pod 210 may be labeled to define its own using purpose (specialized for a graphic processing unit (GPU), a solid state drive (SSD) server).

The pod 210 is the smallest unit deployed by Kubernetes, and has attributes of one or more containers 211, a storage 213, and a network 215. At least one container 211 included in the pod 210 may share the storage 213 and the network 215 with each other, and may access a local host with each other.

The hybrid cloud platform 10 includes the plurality of clusters, the plurality of nodes, and the plurality of pods as described above.

Figure 3:
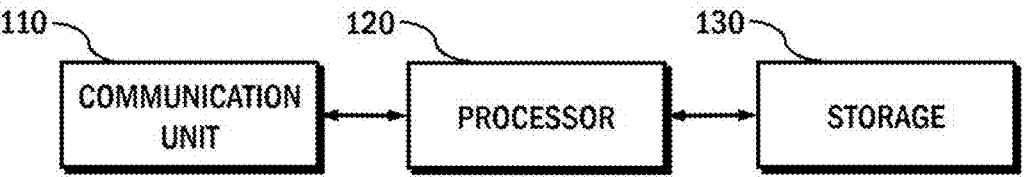
FIG. 3 is a view provided to explain a detailed configuration of a hybrid cloud management device according to an embodiment of the disclosure.

Hereinafter, a configuration of the hybrid cloud management device 100 will be described in detail with reference to FIG. 3. FIG. 3 is a view illustrating the hybrid cloud management device 100 according to an embodiment.

As shown in FIG. 3, the hybrid cloud management device 100 may include a communication unit 110, a processor 120, and a storage 130.

The communication unit 110 may be a communication means for exchanging data necessary for operations of the processor 120, and may perform communication wirelessly or wiredly.

Specifically, the communication unit 110 may be connected to be able to communicate with the hybrid cloud platform 10, and may receive a resource allocation request for a specific service. Herein, the resource allocation request for the specific service may include information regarding resources necessary for the corresponding service, and specifically, the resource allocation request for the specific service may include at least one of API version information, type information, label information, CPU requirements, memory requirements, storage requirements, policy information, restriction to the number of times disorder occurs, and regional information. In addition, the resource allocation request for the specific service may further include information regarding a weight for each type of resource.

In addition, the communication unit 110 may collect metric data regarding a resource use rate from one or more clusters supporting an application service operating in a hybrid cloud using environment.

The storage 130 may be a storage medium which stores a program and data necessary for operations of the processor 130.

The processor 120 may control overall operations of the hybrid cloud management device 100.

The processor 120 may analyze the resource use rate based on the collected metric data, and may perform resource defragmentation for guaranteeing resources according to a result of the analyzing.

For example, when a current resource use rate is greater than or equal to a threshold value included in a pre-set policy, the processor 120 may perform resource defragmentation for guaranteeing resources.

In addition, the processor 120 may perform resource defragmentation for guaranteeing resources with respect to all clouds supporting an application service which is operating in a hybrid cloud using environment, and, when performing resource defragmentation, the processor 120 may perform at least two of HPA (increasing the number of resource replicas), VPA (increasing allocated resources), and migration (transferring resources), simultaneously, rather than simply expanding the number of replicas.

Specifically, when performing resource defragmentation, the processor 120 may perform scaling in at least one method of the VPA and the HPA by considering a current state of available resources, and, when the current resource use rate is greater than or equal to the threshold value included in the pre-set policy even after scaling is performed, the processor 120 may perform migration.

Figure 4:
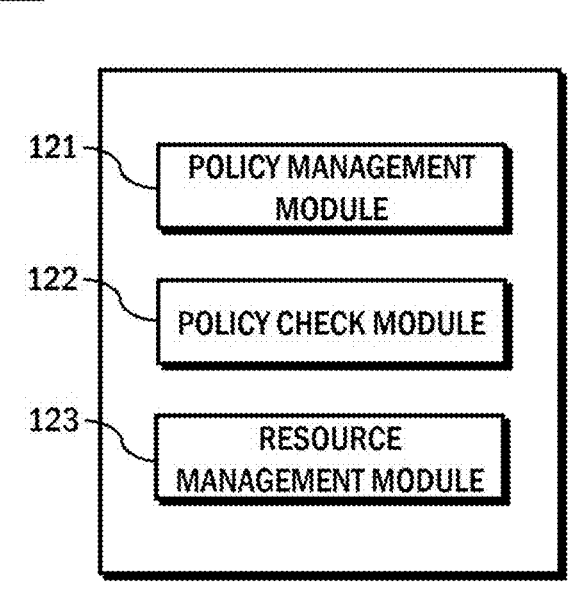
FIG. 4 is a view provided to explain a detailed configuration of a processor according to an embodiment of the disclosure.
Figure 5:
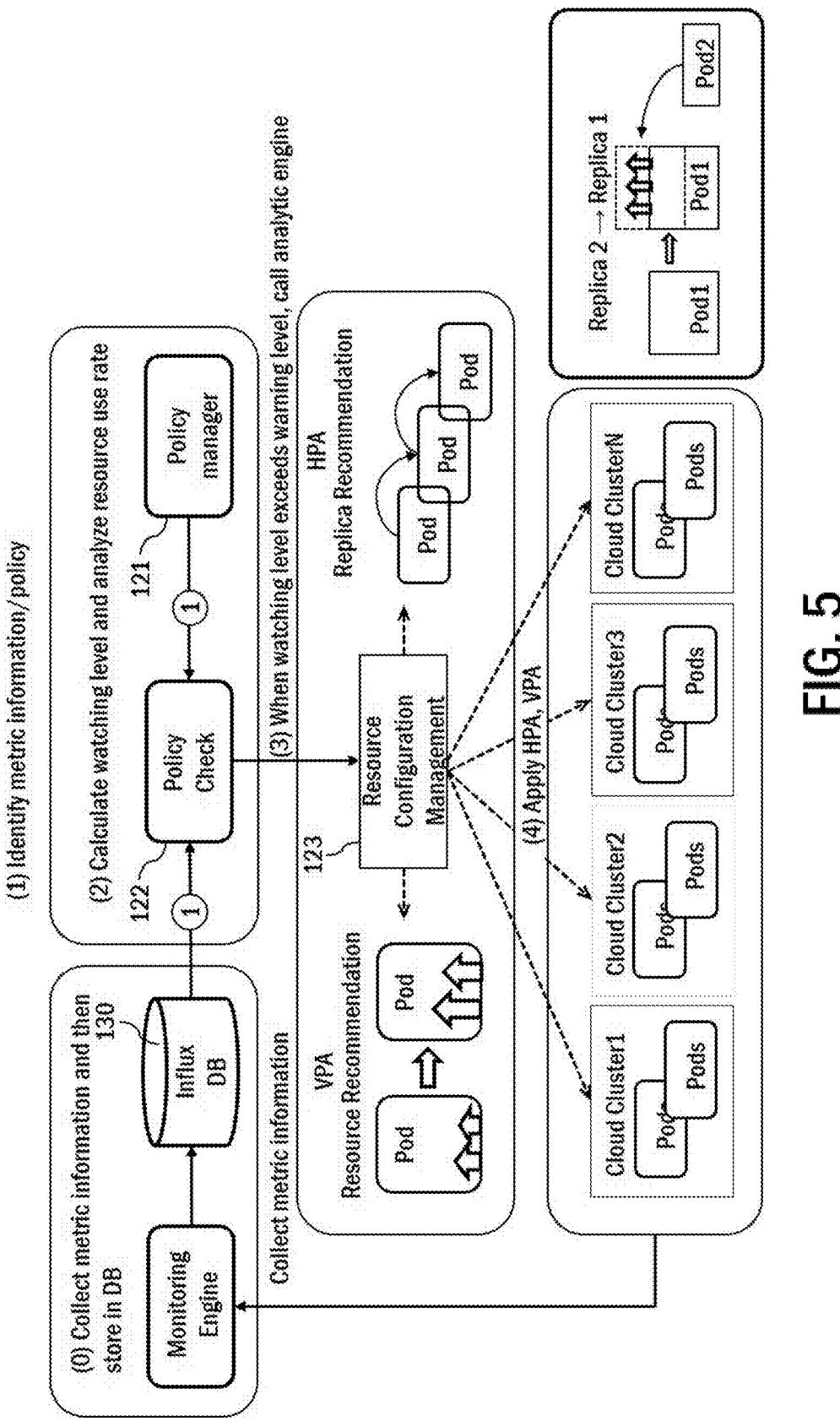
FIG. 5 is a view provided to explain operation characteristics of the hybrid cloud management device according to an embodiment of the disclosure.

FIG. 4 is a view provided to explain a detailed configuration of the processor according to an embodiment, and FIG. 5 is a view provided to explain operation characteristics of the hybrid cloud management device according to an embodiment.

Referring to FIGS. 4 and 5, the processor may include a policy management module 121, a policy check module 122, and a resource management module 123.

The policy management module 121 may be provided to manage a policy set by a user.

Specifically, the policy management module 121 may receive information regarding a user policy from a user device, may set a threshold value (policy value), and may transmit the information regarding the policy including the set threshold value, as indicated with ① in FIG. 5, to the policy check module 122.

In this case, the policy management module 121 may generate a user policy that includes a plurality of watching levels set for a resource use rate, and a threshold level (warning level) value set to check whether a resource use rate reaches a specific level among the plurality of watching levels through the policy check module 122. Herein, the policy management module 121 may set the threshold level value included in the user policy to have different threshold level values according to available resources.

The policy check module 122 may acquire the information regarding the policy, which is set by the policy management module 121, and may determine whether a current resource use rate is greater than or equal to a threshold value included in a pre-set policy, based on the information regarding the policy.

For example, when a CPU use rate is greater than or equal to a pre-set CPU threshold level value according to a user policy, the policy check module 122 may request the resource management module 123 to perform resource defragmentation with respect to CPU resources.

In addition, when a memory use rate is greater than or equal to a pre-set memory threshold level value according to a user policy, the policy check module 122 may request the resource management module 123 to perform resource defragmentation with respect to memory resources. The CPU threshold level value and the memory threshold level value may be set to have different level values.

The resource management module 123 may perform resource defragmentation when a current resource use rate is greater than or equal to a threshold value included in a pre-set policy.

When available resources of a node including a specific pod are less than resources allocated to the specific pod, the resource management module 123 may scale the resources of the specific pod in the VPA method by increasing the resources allocated to the specific pod.

In addition, when the available resources of the node including the specific pod are larger than or equal to the resources allocated to the specific pod, the resource management module 123 may scale the resources of the specific pod in the HPA method by generating a replica pod in the corresponding node by copying the same pod as the specific pod, and setting the specific pod and the replica pod to perform the same service.

In addition, when the resource use rate is greater than or equal to the threshold value included in the pre-set policy even after scaling is performed in at least one method of the VPA and the HPA, the resource management module 123 may perform migration between clusters.

Specifically, the resource management module 123 may predict a resource use rate of a future time regarding a plurality of nodes included in one or more interlocking clusters by using a prediction model, and may filter a node the resource use rate of which increases by the pre-set threshold value or higher, based on a result of the predicting, may select, as a migration target cluster, a cluster that includes a node having the lowest resource use rate among the remaining nodes, and may perform migration.

Through this, problems of a related-art method of simply expanding replicas in response to a resource request of a service operating in a cloud environment (Kubernetes) may be solved, and rapid processing (deployment) may be performed in response to a continuous resource request, and an available space for using resources may be guaranteed by applying a method of HPA (increasing the number of resource replicas), VPA (increasing allocated resources), migration (transferring resources), rather than simply expanding the number of replicas.

Figure 6:
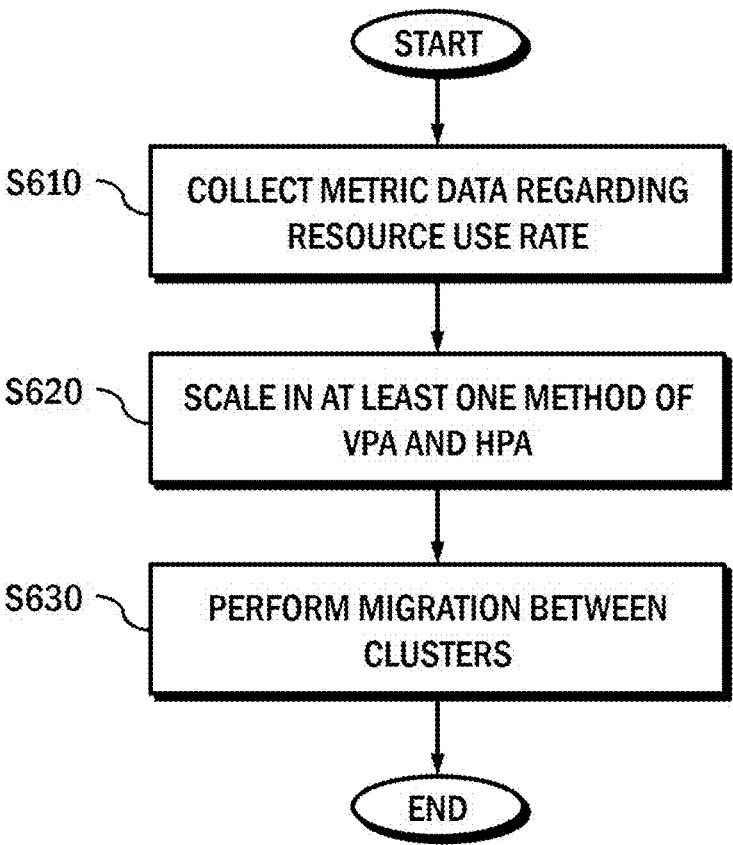
FIG. 6 is a view provided to explain a hybrid cloud management method according to an embodiment of the disclosure.

FIG. 6 is a view provided to explain a hybrid cloud management method according to an embodiment.

The hybrid cloud management method according to an embodiment may be executed by a hybrid cloud management device.

Referring to FIG. 6, the hybrid cloud management method may collect metric data regarding a resource use rate from one or more clusters supporting an application service operating in a hybrid cloud using environment, by using the hybrid cloud management device (S610), may analyze the resource use rate based on the collected metric data, and may perform resource defragmentation for guaranteeing resources according to a result of the analyzing.

Specifically, when performing resource defragmentation, the hybrid cloud management method may perform scaling in at least one method of VPA and HPA by considering a current state of available resources (S620).

For example, the hybrid cloud management method may consider the current state of available resources, and, when available resources of a node including a specific pod are less than resources allocated to the specific pod, the hybrid cloud management method may scale the resources of the specific pod in the VPA method by increasing the resources allocated to the specific pod, and, when the available resources of the node including the specific pod are larger than or equal to the resources allocated to the specific pod, the hybrid cloud management method may scale the resources of the specific pod in the HPA method by generating a replica pod in the corresponding node by copying the same pod as the specific pod, and setting the specific pod and the replica pod to perform the same service.

In addition, when the resource use rate is greater than or equal to the threshold value included in the pre-set policy even after scaling is performed in at least one method of the VPA and the HPA, the hybrid cloud management method may perform migration (S630).

Figure 7:
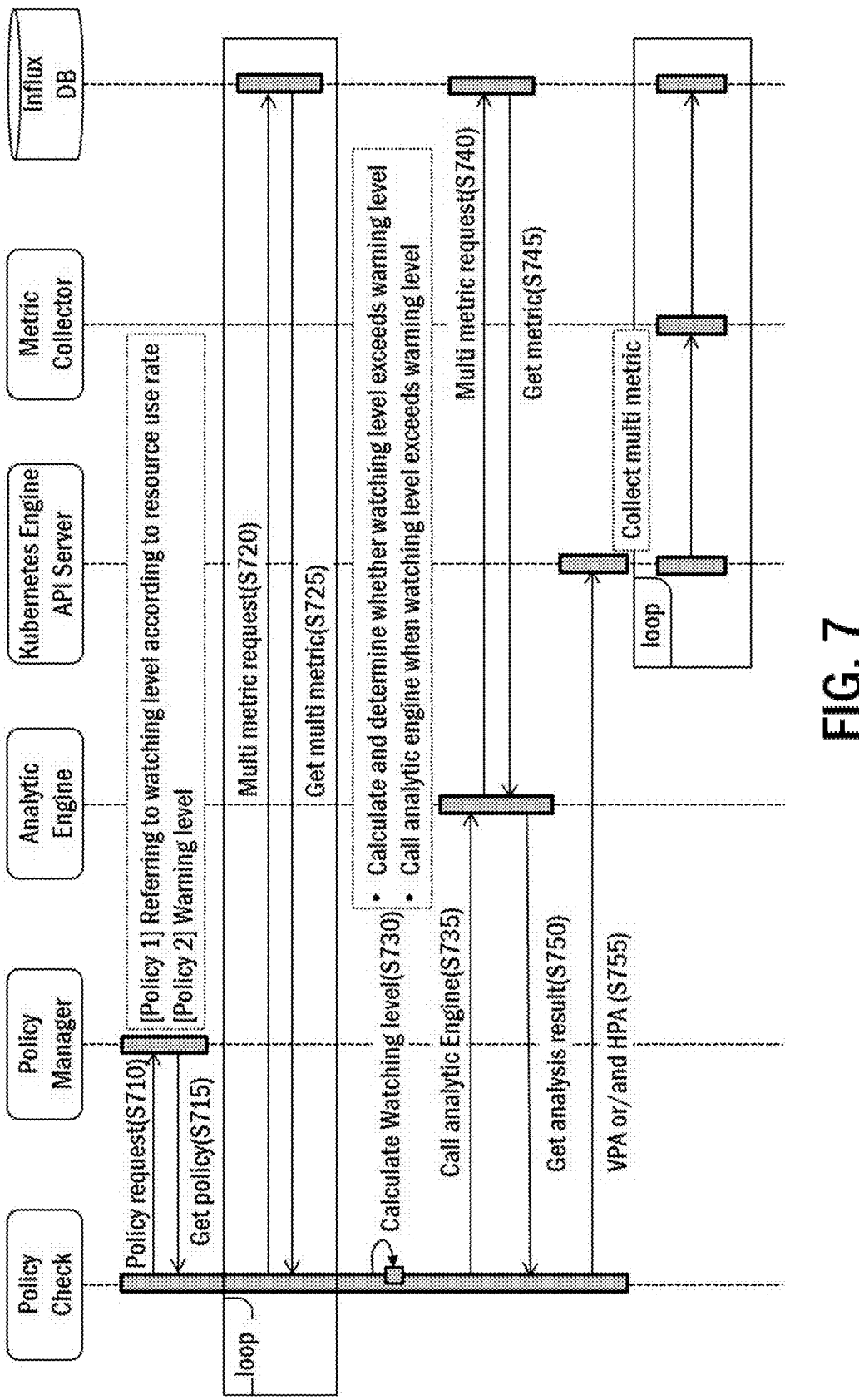
FIG. 7 is a view provided to explain the hybrid cloud management method in detail according to an embodiment of the disclosure.

FIG. 7 is a view provided to explain the hybrid cloud management method in detail according to an embodiment.

Referring to FIG. 7, according to the hybrid cloud management method of the disclosure, the policy check module 122 may request information regarding a user policy from the policy management module 121 (S710), and may acquire the information regarding the user policy from the policy management module 121 (S715).

The policy check module 122 may request metric data regarding a resource use rate, as indicated with ① in FIG.

5, from an Influx DB of the storage 130 (S720), and may receive the metric data regarding the resource use rate from the Influx DB (S725).

Thereafter, the policy check module 122 may determine whether a current resource use rate is greater than or equal to a threshold value included in a pre-set policy, based on the information regarding the policy (S730), and, when the current resource use rate is greater than or equal to the threshold value, the policy check module 122 may call an analytic engine provided in the resource management module 123 (S735).

In this case, the resource management module 123 may perform resource defragmentation in response to the call of the policy check module 122.

Specifically, the resource management module 123 may request metric data regarding a resource use rate from the Influx DB in response to the call of the policy check module 122 (S740), may receive the metric data regarding the resource use rate (S745), and may determine whether available resources of a node including a specific pod are less than resources allocated to the specific pod, or whether the available resources of the node including the specific pod are larger than or equal to the resources allocated to the specific pod, based on the received metric data regarding the resource use rate.

The resource management module 123 may transmit a result of the determining to the policy check module 122 (S750), and may perform scaling in at least one method of the VPA and the HPA by interlocking with an API server (S755).

In addition, when the resource use rate is greater than or equal to the threshold value included in the pre-set policy even after scaling is performed in at least one method of the VPA and the HPA, the resource management module 123 may perform migration between clusters.

Through this, an available space for using resources may be guaranteed by applying a method of HPA (increasing the number of resource replicas), VPA (increasing allocated resources), migration (transferring resources), rather than simply expanding the number of replicas.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A processor-implemented method for hybrid cloud management, the method comprising:

collecting, by a hybrid cloud management device, metric data regarding a current resource use rate of one or more computing resources associated with an application service from a plurality of nodes included in one or more clusters supporting the application service operating in a hybrid cloud environment;

determining, by the hybrid cloud management device, the current resource use rate, based on the collected metric data;

performing resource defragmentation by allocating available resources to the one or more clusters according to a pre-set policy used in a policy-based threshold determination, the policy-based threshold determination including determining whether the current resource use rate satisfies a pre-set threshold value included in the pre-set policy, based on the resource use rate; and providing a requested service executed in a node of a cluster, from among plural nodes, based on the resource defragmentation, wherein the performing resource defragmentation further includes:

predicting a predicted resource use rate of a future time regarding a plurality of nodes included in one or more interlocking clusters by using a prediction model;

filtering a node whose predicted resource use rate increases by the pre-set threshold value or more, based on a result of the predicting;

selecting, as a migration target cluster, a cluster that includes a node having a lowest predicted resource use rate among remaining nodes after the filtering; and performing migration of the filtered node to the migration target cluster depending on a determination that the predicted resource use rate remains greater than the pre-set threshold value even after performing at least one of vertical pod autoscaling and horizontal pod autoscaling.

2. The method of claim 1, wherein the performing resource defragmentation comprises, when the current resource use rate is greater than or equal to the pre-set threshold value included in the pre-set policy, performing the resource defragmentation for guaranteeing the resources.

3. The method of claim 2, wherein the performing resource defragmentation comprises performing the resource defragmentation for guaranteeing the resources with respect to all clouds supporting the application service operating in the hybrid cloud environment, and wherein the resource defragmentation is performed by performing at least two methods of Horizontal Pod Autoscaling (HPA) by increasing a number of resource replicas, Vertical Pod Autoscaling (VPA) by increasing allocated resources allocated for the application service, and migration by transferring resources, simultaneously, rather than simply expanding a number of replicas.

4. The method of claim 3, wherein the performing resource defragmentation comprises:

scaling using at least one method of the VPA and the HPA by considering a current state of available resources to be allocated for the application service; and when the current resource use rate is greater than or equal to the pre-set threshold value included in the pre-set policy even when scaling is performed, performing migration.

5. The method of claim 4, wherein the hybrid cloud management device comprises a processor comprising:

a policy management module configured to manage a policy set by a user;

a policy check module configured to acquire information regarding the set policy from the policy management module, and to determine whether the current resource use rate is greater than or equal to the pre-set threshold value included in the pre-set policy, based on the information regarding the set policy; and a resource management module configured to perform resource defragmentation when the current resource use rate is greater than or equal to the threshold value included in the pre-set policy.

6. The method of claim 5, wherein the resource management module is configured to, when available resources of a node, the node including plural pods, are less than resources allocated to at least one pod of the plural pods, scale the resources of the at least one pod in the VPA by increasing the resources allocated to the at least one pod.

7. The method of claim 5, wherein the resource management module is configured to, when available resources of a node including a specific pod are larger than or equal to resources allocated to the specific pod, scale the resources of the specific pod in the HPA by generating a replica pod in the corresponding node by copying the replica pod as the specific pod, and by setting the specific pod and the replica pod to perform a same service.

8. The method of claim 5, wherein the resource management module is configured to perform migration between clusters when the current resource use rate is greater than or equal to the pre-set threshold value included in the pre-set policy even after scaling is performed by at least one method of the VPA and the HPA.

9. A non-transitory computer-readable recording medium having a computer program recorded thereon to configure a processor to perform a hybrid cloud management method, the method comprising:

collecting, by a hybrid cloud management device, metric data regarding a current resource use rate of one or more computing resources associated with an application service from a plurality of nodes included in one or more clusters supporting the application service operating in a hybrid cloud environment; and determining, by the hybrid cloud management device, the current resource use rate, based on the collected metric data;

performing resource defragmentation by allocating available resources to the one or more clusters according to a pre-set policy used in a policy-based threshold determination, the policy-based threshold determination including determining whether the current resource use rate satisfies the pre-set threshold value included in the pre-set policy, based on the resource use rate; and providing a requested service executed in a node of a cluster, from among plural nodes, based on the resource defragmentation, wherein the performing resource defragmentation further includes:

predicting a predicted resource use rate of a future time regarding a plurality of nodes included in one or more interlocking clusters by using a prediction model;

filtering a node whose predicted resource use rate increases by the pre-set threshold value or more, based on a result of the predicting;

selecting, as a migration target cluster, a cluster that includes a node having a lowest predicted resource use rate among remaining nodes after the filtering; and performing migration of the filtered node to the migration target cluster depending on a determination that the predicted resource use rate remains greater than the pre-set threshold value even after performing at least one of vertical pod autoscaling and horizontal pod autoscaling.

10. A hybrid cloud management device comprising:

a processor configured to:

collect metric data regarding a current resource use rate of one or more computing resources associated with an application service from a plurality of nodes included in one or more clusters supporting an application service operating in a hybrid cloud environment;

determine the current resource use rate, based on the collected metric data;

perform resource defragmentation by allocating available resources to the one or more clusters according to a pre-set policy used in a policy-based threshold determination, the policy-based threshold determination including determining whether the current resource use rate satisfies a pre-set threshold value included in the pre-set policy, based on the resource use rate; and provide a requested service executed in a node of a cluster, from among plural nodes, based on the resource defragmentation, wherein the performing resource defragmentation further includes:

predicting a predicted resource use rate of a future time regarding a plurality of nodes included in one or more interlocking clusters by using a prediction model;

filtering a node whose predicted resource use rate increases by the pre-set threshold value or more, based on a result of the predicting;

selecting, as a migration target cluster, a cluster that includes a node having a lowest predicted resource use rate among remaining nodes after the filtering; and performing migration of the filtered node to the migration target cluster depending on a determination that the predicted resource use rate remains greater than the pre-set threshold value even after performing at least one of vertical pod autoscaling and horizontal pod autoscaling.

11. The device of claim 10, wherein the performing the resource defragmentation comprises, when the current resource use rate is greater than or equal to the pre-set threshold value included in the pre-set policy, performing the resource defragmentation for guaranteeing the resources.

12. The device of claim 11, wherein the performing the resource defragmentation comprises performing the resource defragmentation for guaranteeing the resources with respect to all clouds supporting the application service operating in the hybrid cloud environment, and wherein the resource defragmentation is performed by performing at least two methods of Horizontal Pod Autoscaling (HPA) by increasing a number of resource replicas, Vertical Pod Autoscaling (VPA) by increasing allocated resources allocated for the application service, and migration by transferring resources, simultaneously, rather than simply expanding a number of replicas.

13. The device of claim 12, wherein the performing the resource defragmentation comprises:

scaling using at least one method of the VPA and the HPA by considering the current state of available resources to be allocated for the application service; and when the current resource use rate is greater than or equal to the pre-set threshold value included in the pre-set policy even when scaling is performed, performing migration.

14. The device of claim 13, wherein the processor further comprising:

a policy management module configured to manage a policy set by a user;

a policy check module configured to acquire information regarding the set policy from the policy management module, and to determine whether the current resource use rate is greater than or equal to the pre-set threshold value included in the pre-set policy, based on the information regarding the set policy; and a resource management module configured to perform resource defragmentation when the current resource use rate is greater than or equal to the pre-set threshold value included in the pre-set policy.

15. The device of claim 14, wherein the resource management module is configured to, when available resources of a node, the node including plural pods, are less than resources allocated to at least one pod of the plural pods, scale the resources of the at least one pod in the VPA by increasing the resources allocated to the at least one pod.

16. The device of claim 14, wherein the resource management module is configured to, when available resources of a node including a specific pod are larger than or equal to resources allocated to the specific pod, scale the resources of the specific pod in the HPA by generating a replica pod in the corresponding node by copying the replica pod as the specific pod, and by setting the specific pod and the replica pod to perform a same service.

17. The device of claim 14, wherein the resource management module is configured to perform migration between clusters when the current resource use rate is greater than or equal to the pre-set threshold value included in the pre-set policy even after scaling is performed by at least one method of the VPA and the HPA.

* * * * *